(12) United States Patent
Ichijima et al.

(10) Patent No.: US 10,939,007 B2
(45) Date of Patent: Mar. 2, 2021

(54) INFORMATION CONTROL APPARATUS AND SYSTEM, AND NON-TRANSITORY COMPUTER READABLE MEDIUM

(71) Applicant: FUJI XEROX CO., LTD., Tokyo (JP)

(72) Inventors: Shingo Ichijima, Kanagawa (JP); Hideo Kato, Kanagawa (JP); Hisao Komazawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/190,836

(22) Filed: Nov. 14, 2018

(65) Prior Publication Data

US 2019/0166270 A1 May 30, 2019

(30) Foreign Application Priority Data

Nov. 27, 2017 (JP) ................ JP2017-226990

(51) Int. Cl.
*H04N 1/00* (2006.01)
*G06F 3/12* (2006.01)

(52) U.S. Cl.
CPC ......... *H04N 1/00663* (2013.01); *G06F 3/121* (2013.01); *G06F 3/1234* (2013.01); *H04N 1/0066* (2013.01); *H04N 1/00413* (2013.01); *H04N 1/00604* (2013.01); *H04N 1/00623* (2013.01); *H04N 1/00628* (2013.01)

(58) Field of Classification Search
CPC ........... H04N 1/00663; H04N 1/00413; H04N 1/00604; H04N 1/00623; H04N 1/00628; H04N 1/0066; G06F 3/121; G06F 3/1234

USPC ....................................... 358/1.13
See application file for complete search history.

(56) References Cited

U.S. PATENT DOCUMENTS

| 6,167,232 | A | * | 12/2000 | Jimenez | ................. B41J 13/103 358/498 |
| 6,708,971 | B1 | * | 3/2004 | Sasaki | ..................... B65H 1/00 271/117 |
| 2004/0012140 | A1 | * | 1/2004 | Asada | .................. B65H 3/5223 271/121 |
| 2009/0304430 | A1 | * | 12/2009 | Vetromile | ............ G03G 15/655 400/605 |
| 2017/0166411 | A1 | * | 6/2017 | Kawarago | ................ B65H 3/46 |

FOREIGN PATENT DOCUMENTS

JP 2008-262103 A 10/2008

* cited by examiner

*Primary Examiner* — Allen H Nguyen
(74) *Attorney, Agent, or Firm* — Oliff PLC (57) ABSTRACT

An information control apparatus controls a printer apparatus. The printer apparatus includes a loader which stacks and loads sheets fed from a sheet feeder and then printed. The information control apparatus includes a controller. In a case in which printing performed by the printer apparatus is stopped and is then restarted, the controller performs control so that a sheet which will protrude from other sheets when being loaded in the loader will be fed from the sheet feeder and be loaded in the loader as a sheet to be inserted to indicate a restart position.

12 Claims, 12 Drawing Sheets

INFORMATION CONTROL APPARATUS AND SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-226990 filed Nov. 27, 2017.

BACKGROUND

(i) Technical Field

The present invention relates to an information control apparatus and system and a non-transitory computer readable medium.

(ii) Related Art

When printing has stopped for some reason, such as a paper jam, during the execution of printing of multiple pages, and when printing is restarted, it is desirable for a user to able to identify a position at which printing is restarted so as to check for the omission of pages or printing of the same page more than one time. To respond to such a demand, a printer control apparatus has been proposed to make it easy to identify a position at which printing is restarted.

SUMMARY

According to an aspect of the invention, there is provided an information control apparatus for controlling a printer apparatus. The printer apparatus includes a loader which stacks and loads sheets fed from a sheet feeder and then printed. The information control apparatus includes a controller. In a case in which printing performed by the printer apparatus is stopped and is then restarted, the controller performs control so that a sheet which will protrude from other sheets when being loaded in the loader will be fed from the sheet feeder and be loaded in the loader as a sheet to be inserted to indicate a restart position.

BRIEF DESCRIPTION OF THE DRAWINGS

Exemplary embodiments of the present invention will be described in detail based on the following figures, wherein.

DETAILED DESCRIPTION

First Exemplary Embodiment

A first exemplary embodiment of the invention will be described below in detail with reference to the accompanying drawings.

(Configuration of Print Control System)

Figure 1:
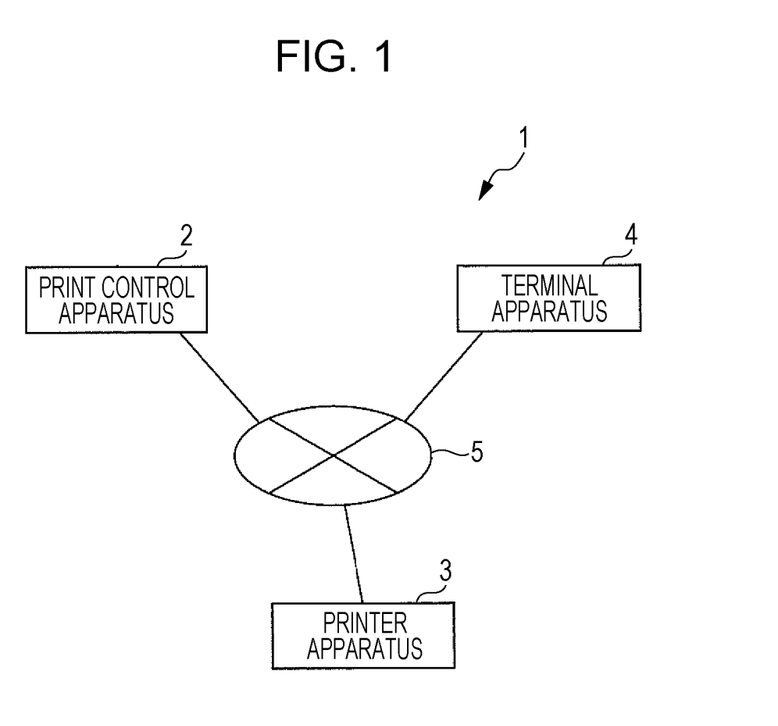
FIG. 1 is a schematic diagram illustrating an example of the configuration of a print control system according to a first exemplary embodiment.

FIG. 1 is a schematic diagram illustrating an example of the configuration of a print control system 1 according to the first exemplary embodiment.

As shown in FIG. 1, the print control system 1 includes a print control apparatus 2, a printer apparatus 3, and a terminal apparatus 4 connected to one another via a network 5. Although the single printer apparatus 3 and the single terminal apparatus 4 are shown in FIG. 1, plural printer apparatuses and plural terminal apparatuses may be provided.

The print control apparatus 2 controls print operation executed by the printer apparatus 3 in response to a request from the terminal apparatus 4. The print control apparatus 2 also monitors the occurrence of an error which may stop printing performed by the printer apparatus 3, and controls print restart processing for restarting printing in the printer apparatus 3 in accordance with the content of an error. The print control apparatus 2 is an example of an information control apparatus.

The printer apparatus 3 executes printing in response to a request from the terminal apparatus 4 under the control of the print control apparatus 2, and outputs a printed material. The printer apparatus 3 may have functions other than a print function, such as a scan function and a fax sending-and-receiving function. The printer apparatus 3 may be constituted by plural units corresponding to the individual functions, instead of a single unit.

The terminal apparatus 4 includes a display, such as a liquid crystal display, and an operation unit, such as a keyboard and a mouse. In accordance with the content of operation performed by using the operation unit of the terminal apparatus 4, a print instruction is sent from the print control apparatus 2 to the printer apparatus 3.

The network 5 is a local area network (LAN) or the Internet, for example, and may be either of a wired medium or a wireless medium.

(Configuration of Print Control Apparatus)

Figure 2:
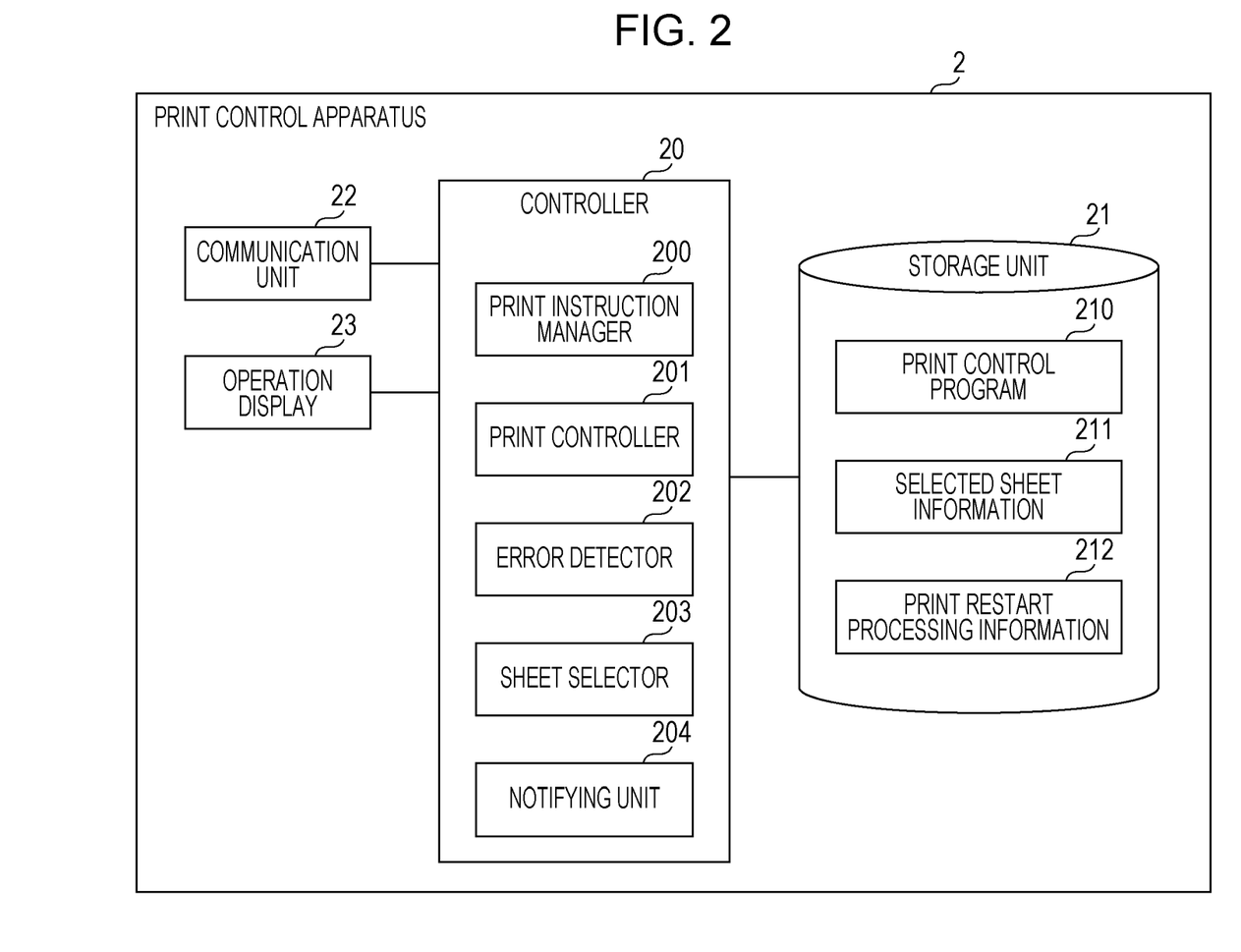
FIG. 2 is a block diagram illustrating an example of the configuration of a print control apparatus.

FIG. 2 is a block diagram illustrating an example of the configuration of the print control apparatus 2.

The print control apparatus 2 includes a controller 20, a storage unit 21, a communication unit 22, and an operation display 23.

The controller 20, which is constituted by a central processing unit (CPU) and a memory, for example, controls the individual elements and also executes various programs. The storage unit 21 is constituted by storage devices, such as a hard disk drive (HDD) and a flash memory, and stores information. The controller 20 and the storage unit 21 will be described in detail later.

The communication unit 22 communicates with the printer apparatus 3 and the terminal apparatus 4 via the network 5. The operation display 23 is a user interface, which is constituted by a graphical user interface (GUI) or a touchscreen which receives an instruction from a user while presenting information such as an image to the user. The operation display 23 is not restricted to a GUI or a touchscreen.

As a result of operating in accordance with a print control program 210 stored in the storage unit 21, the controller 20 serves as a print instruction manager 200, a print controller 201, an error detector 202, a sheet selector 203, and a notifying unit 204.

The print instruction manager 200 manages a print instruction sent from the terminal apparatus 4 and supplies it to the print controller 201. The print controller 201 supplies the print instruction to the printer apparatus 3 and controls the execution of printing in the printer apparatus 3. The print controller 201 sets settings for restarting printing after printing has stopped and controls print restart processing. Print restart processing to be executed after printing has stopped will be discussed in detail later.

The error detector 202 monitors print operation based on information sent from the printer apparatus 3 and detects a print error, such as a paper jam. Other examples of print errors which may stop printing are paper out and an error in a post-processor if the printer apparatus 3 includes a post-processor. In addition to such accidental errors, an instruction to temporarily stop printing provided by a user is also regarded as an error.

When the print controller 201 sets settings for print restart processing, the sheet selector 203 selects a sheet to be output first after printing is restarted and to be inserted to indicate a print restart position. The notifying unit 204 notifies a user in print restart processing that a sheet different from the previous sheets has been supplied to indicate a print restart position or that a sheet selected by the sheet selector 203 is not possible to feed. The content of such information is displayed on the operation display 23. The notifying unit 204 may also supply such information to the terminal apparatus 4, and the information may be displayed on the terminal apparatus 4.

The storage unit 21 stores the print control program 210, selected sheet information 211, and print restart processing information 212. As discussed above, the print control program 210 causes the controller 20 to serve as the print instruction manager 200, the print controller 201, the error detector 202, the sheet selector 203, and the notifying unit 204. The selected sheet information 211 is information concerning a sheet selected by the sheet selector 203 to indicate a print restart position. The print restart processing information 212 is information concerning print restart processing set by the print controller 201, such as that indicating a location where printed sheets have been output when printing has stopped and from which portion of a document printing will restart.

(Configuration of Printer Apparatus)

Figure 3:
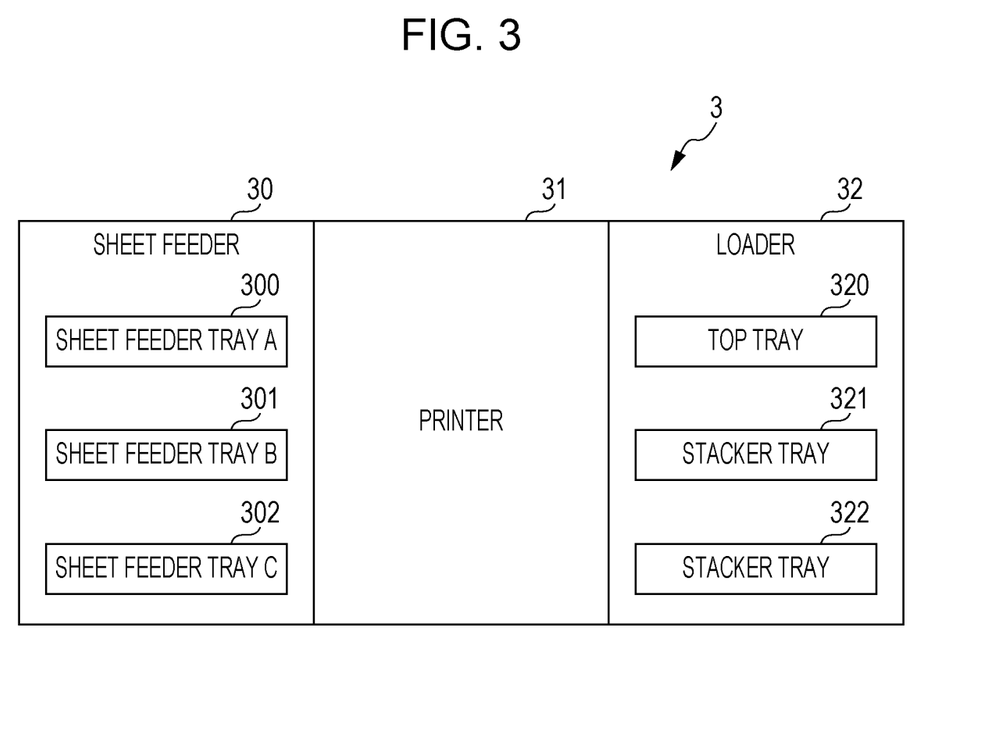
FIG. 3 is a block diagram illustrating an example of the schematic configuration of a printer apparatus.

FIG. 3 is a block diagram illustrating an example of the schematic configuration of the printer apparatus 3.

The printer apparatus 3 is constituted by a sheet feeder 30, a printer 31, and a loader 32. The sheet feeder 30 includes plural sheet feeder trays 300 through 302 (which may also be called sheet feeder trays A through C, respectively). In the sheet feeder trays 300 through 302, sheets of the same size and arranged in different directions or sheets of different sizes are stored. When printing is started, the sheet feeder 30 feeds a sheet from a certain sheet feeder tray and supplies it to the printer 31. The printer 31 prints on the sheet supplied from the sheet feeder 30 and outputs the printed sheet to the loader 32.

The loader 32 receives a sheet supplied from the printer 31 and loads it such that a user can easily remove it. The loader 32 includes plural trays on which sheets are loaded. In FIG. 3, the loader 32 includes three trays, that is, a top tray 320 on the upper part and stacker trays 321 and 322 on the lower part.

The stacker trays 321 and 322 have an offset function of loading sheets by horizontally displacing them from each other. When a user performs printing by using a collate function, for example, loading of sheets by displacing multiple sets of printed sheets from each other enables the user to easily distinguish the individual sets from each other. The top tray 320 does not have such an offset function.

The stacker trays 321 and 322 may be used alternately so that a large number of printed sheets can continuously be printed without interruption. For example, when one of the stacker trays 321 and 322 becomes full of printed sheets, the other one of the stacker trays 321 and 322 is used, and the printed sheets are removed at the same time. The top tray 320 is usually used for outputting a sample page or a small number of printed materials.

Although in FIG. 3 the sheet feeder 30 and the loader 32 each includes three trays, they may include more than three or less than three trays. The loader 32 includes both of a tray with the offset function and a tray without it. However, the loader 32 may only have trays without the offset function. Additionally, even when sheets are output to a tray with the offset function, they may be output without using the offset function.

Operation of First Exemplary Embodiment

Figure 4:
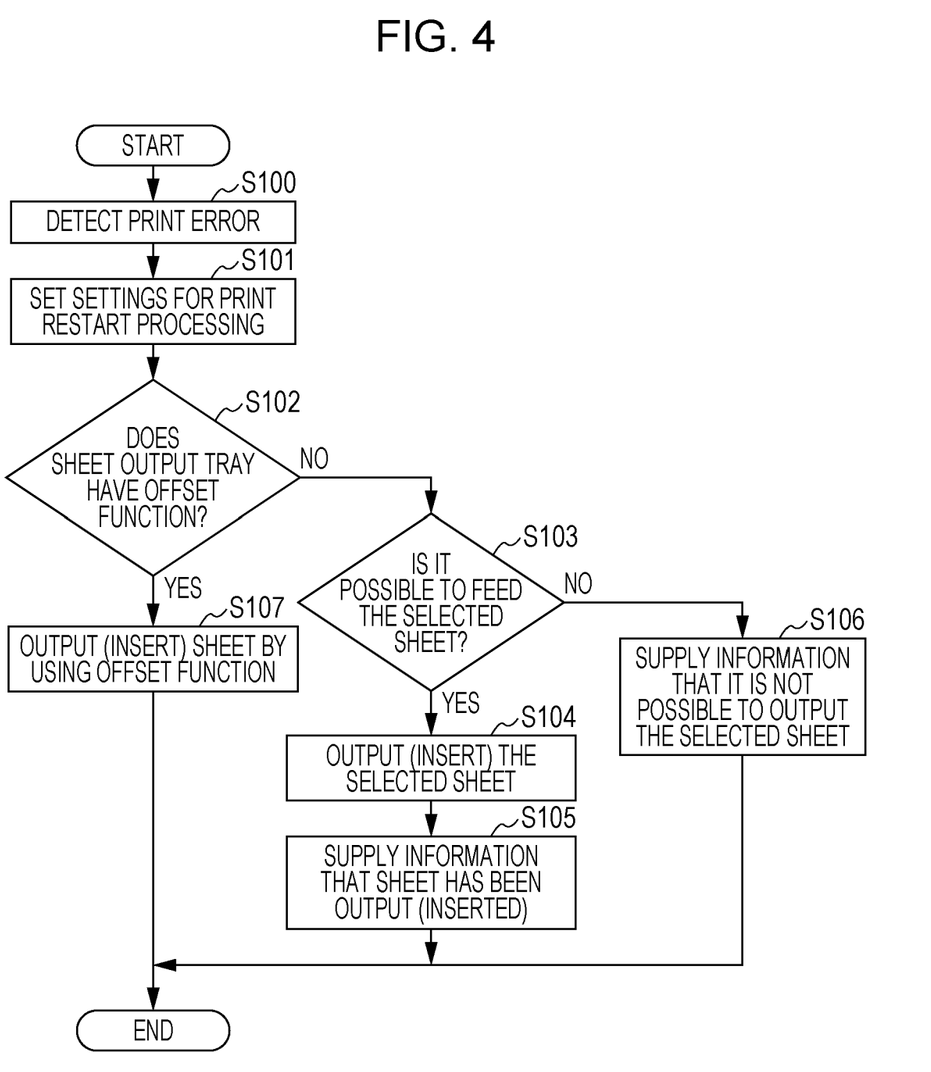
FIG. 4 is a flowchart illustrating an example of the operation of the print control apparatus according to the first exemplary embodiment.

The operation of the print control apparatus 2 according to the first exemplary embodiment will be described below with reference to FIG. 4. FIG. 4 is a flowchart illustrating an example of the operation of the print control apparatus 2 according to the first exemplary embodiment.

In step S100, the error detector 202 of the print control apparatus 2 regularly receives from the printer apparatus 3 information concerning the state of the printer apparatus 3 and detects the occurrence of a print error based on the information.

Upon detection of a print error, in step S101, the print controller 201 stops printing executed by the printer apparatus 3 and sets settings for print restart processing to be executed after the printer apparatus 3 has recovered from the error. More specifically, the print controller 201 sets settings for restarting printing, such as a setting concerning whether to execute processing for providing a mark for indicating a print restart position to printed sheets to be loaded in the loader 32 (such processing will be called recovery offset") and settings concerning the content of recovery offset if it is executed. Settings for print restart processing are set by using a GUI screen displayed on the operation display 23 of the print control apparatus 2.

Figure 5:
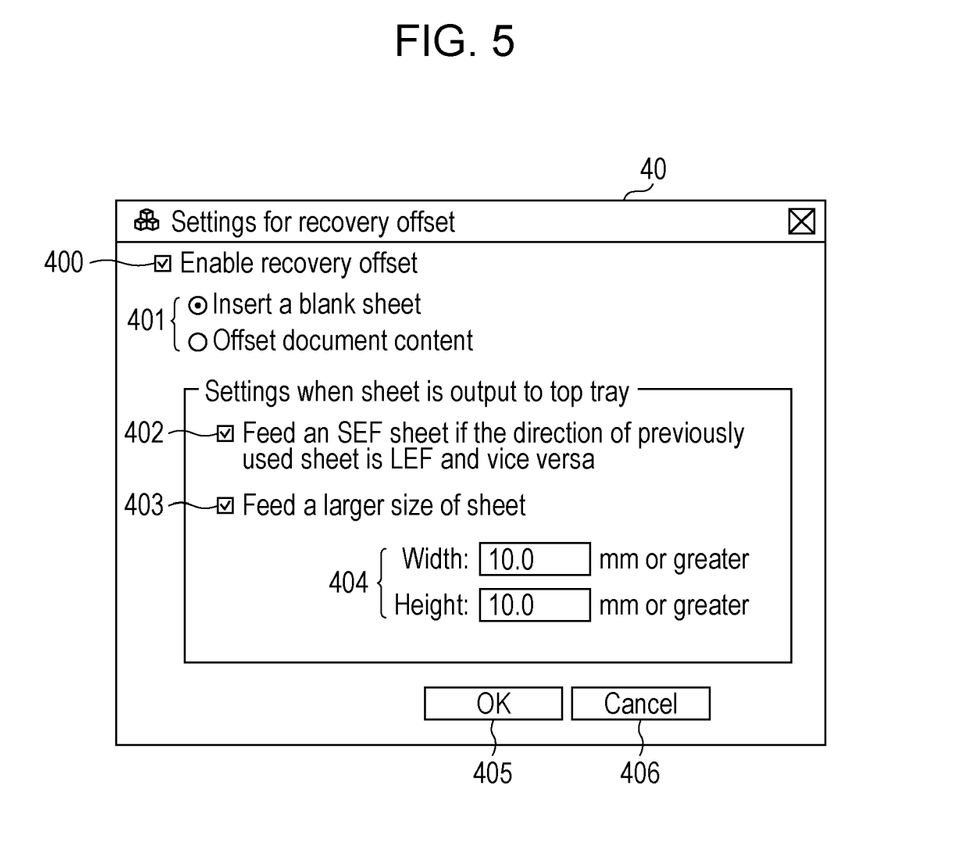
FIG. 5 illustrates an example of a graphical user interface (GUI) screen for setting settings for print restart processing according to the first exemplary embodiment.

FIG. 5 illustrates an example of a GUI screen for setting settings for print restart processing. On a GUI screen 40 shown in FIG. 5, if processing for providing a mark for indicating a print restart position is executed, a check box 400 "Enable recovery offset" is checked. Then, as a mark to be used for indicating a print restart position, an option of inserting a blank sheet at a print restart position or an option of changing the direction of a sheet to be used first for printing the document content after printing is restarted is selected by clicking a corresponding one of radio buttons 401. In FIG. 5, the option "Insert a blank sheet" is selected.

Then, settings for outputting a sheet to the top tray 320 without an offset function or to the stacker tray 321 or 322 with an offset function by not using the offset function are set. Hereinafter, unless otherwise stated, "without an offset function" will also be used for a case in which the offset function of a tray is not used.

Without an offset function, it is not possible to output a sheet by displacing this sheet from the other sheets. Instead, a sheet arranged in a different direction from that of the other sheets is output or a sheet of a different size is output as a mark for indicating a print restart position. More specifically, the option of feeding a sheet arranged in a direction different from that of a sheet used before printing has stopped is selected by checking a check box 402. That is, if the direction of the previously used sheet is short edge feed (SEF), a long edge feed (LEF) sheet is fed, and vice versa. Alternatively, the option of feeding a sheet of a different size from that used before printing has stopped is selected by checking a check box 403.

Instead of selecting one of the options, both the options may be selected, as shown in FIG. 5. In this case, a higher priority is given to one of the options displayed above (check box 402 in FIG. 5) than to the option below (check box 403 in FIG. 5). That is, a sheet arranged in a different direction from that of a sheet used before printing has stopped is preferentially output.

If the option of feeding a sheet of a different size is selected, the size of a sheet is input by numeric values. In FIG. 5, feeding of a larger size of sheet is selected as an example of feeding of a sheet of a different size. The width and height of a sheet are input into numeric value input boxes 404 by numeric values. In this case, a user may specify that any size greater than input numeric values will do or that a sheet of a predetermined size different from that of the previously used sheet will be used. Alternatively, a user may select in advance the largest size of sheet among sheets stored in sheet feeder trays regardless of the size of the previously used sheet. The sheet of a different size is not restricted to a larger size of sheet. A sheet of a smaller size may be used if it partially protrudes from the previously used sheet when being loaded in a sheet output tray.

After finishing inputting settings, when the user clicks an "OK" button 405, the settings are set. If the user wants to stop settings for print restart processing, the user clicks a "Cancel" button 406 to cancel all the settings input by the user.

After the user has set the setting for the type of sheet to be used as described above, the sheet selector 203 sets the selected sheet. The sheet selector 203 stores selected sheet information indicating the type of selected sheet in the storage unit 21 as the selected sheet information 211. The print controller 201 executes print restart processing by using this information.

The print controller 201 may set settings for print restart processing in advance before starting printing, instead of doing when an error is detected. In this case, the print control apparatus 2 may automatically execute print restart processing in accordance with the settings when starting printing.

In step S102, the print controller 201 judges from the information supplied from the printer apparatus 3 whether the sheet output tray that has output printed sheets before printing has stopped has an offset function. More specifically, the print controller 201 judges whether the sheet output tray has an offset function or whether it has an offset function but outputs sheets without using it.

If the sheet output tray does not have an offset function (NO in step S102), the print controller 201 judges in step S103 from the information supplied from the printer apparatus 3 whether it is possible to feed the sheet selected as described above.

If it is possible to feed the selected sheet (YES in step S103), that is, if the selected sheet is stored in a sheet feeder tray, a sheet is fed from this tray and output when printing is restarted in step S104.

If the settings are set as those on the GUI screen 40 shown in FIG. 5, both of a blank sheet arranged in a different direction and a blank sheet of a different size are selected. Priority is given to a blank sheet arranged in a different direction. If this type of sheet is stored in a sheet feeder tray, a sheet is fed from this tray and output.

Figure 6:
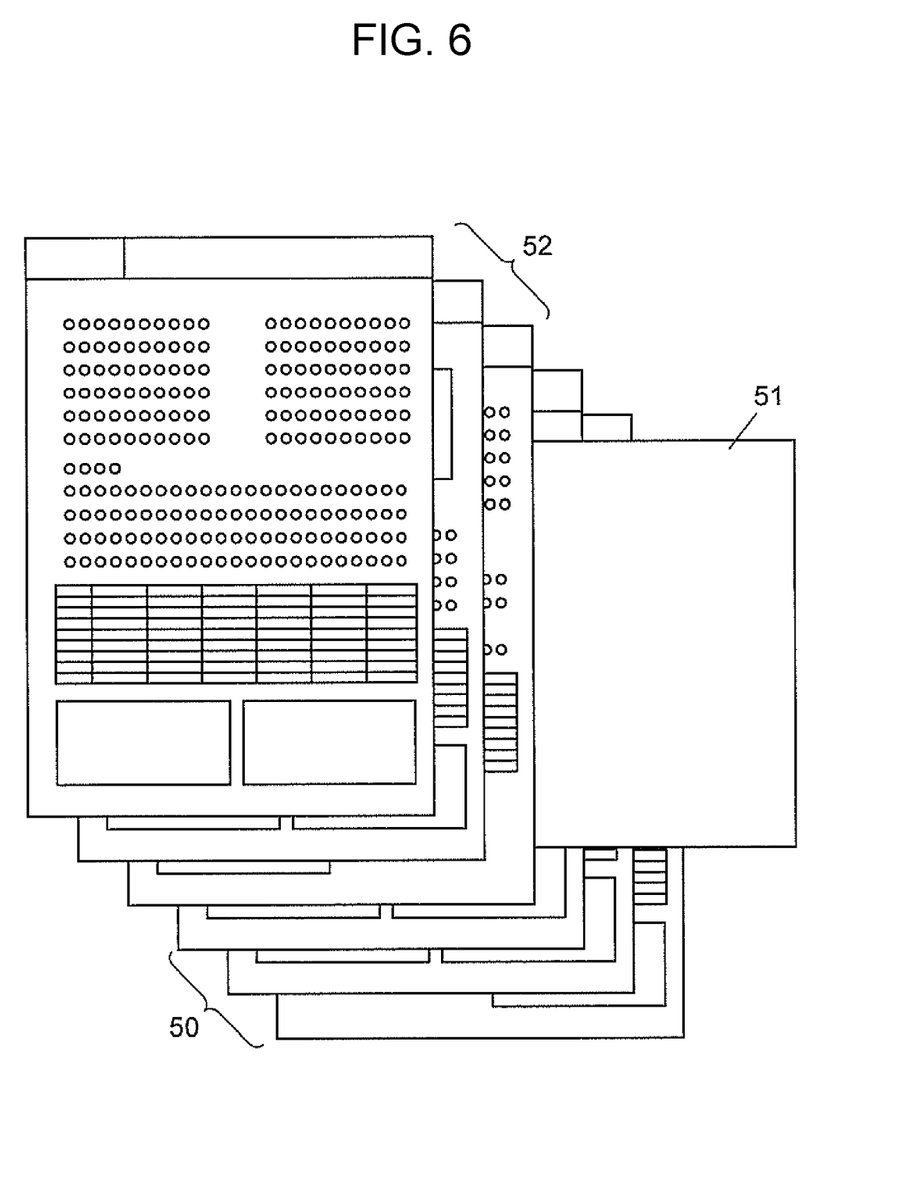
FIG. 6 illustrates a state in which a blank sheet arranged in a different direction is inserted to indicate a print restart position in the first exemplary embodiment.

FIG. 6 illustrates a state in which a blank sheet arranged in a different direction is output to a tray without an offset function. A blank sheet 51 arranged in a different direction is output as a mark for indicating a print restart position subsequent to multiple sheets 50 which have already been output before printing has stopped. Sheets 52 on which the document content continuing from that printed on the sheets 50 is printed are output subsequent to the blank sheet 51 in the same direction as the sheets 50.

In this example, the blank sheet 51 of the same size as the sheets 50 and arranged in a different direction from that of the sheets 50 is output to indicate the print restart position. In this manner, a sheet of the same size but arranged in a direction with respect to the transport direction different from that of the previously output sheets is output so that it will partially protrude from the other sheets when being loaded on a sheet output tray. This enables a user to check the print restart position.

As described above, if a sheet different from that used before printing has stopped (in this example, the blank sheet 51 of the same size but arranged in a different direction) is output to indicate a print restart position, the notifying unit 204 supplies this information in step S105. The information is displayed on the operation display 23.

Figure 7:
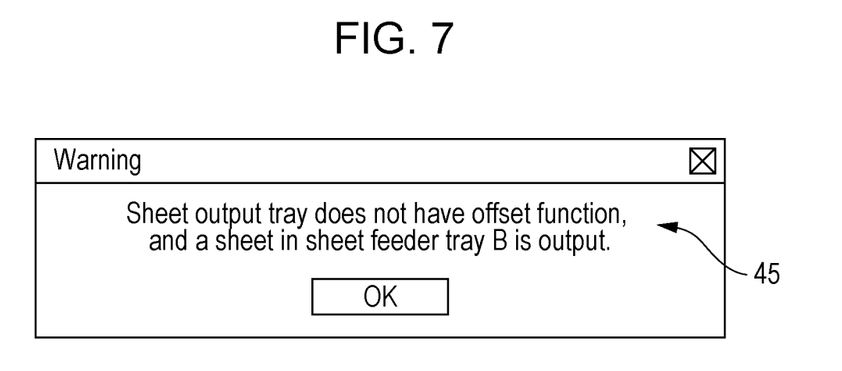
FIG. 7 illustrates an example of a message displayed when a sheet is inserted to indicate a print restart position.

It is now assumed that sheets used for printing the document content, for example, are stored in the sheet feeder tray 300 (sheet feeder tray A) and that blank sheets of the same size but arranged in a different direction from that of the sheets stored in the sheet feeder tray 300 are stored in the sheet feeder tray 301 (sheet feeder tray B) as a sheet to be used for indicating a print restart position. In this case, as shown in FIG. 7, for example, a message 45 that a sheet stored in the sheet feeder tray B has been output because the sheet output tray does not have an offset function is displayed on the operation display 23. The message 45 is displayed as information that a sheet has been inserted to indicate a print restart position.

With this message 45, a user can understand the type of sheet inserted at the print restart position in advance so as to check the print restart position.

If it is found in step S103 that a blank sheet arranged in a different direction is not stored in any sheet feeder tray, the print controller 201 judges whether a larger size of sheet, which is the second highest priority, is stored in a sheet feeder tray. If a larger size of sheet is stored in a sheet feeder tray, a sheet is output from this tray. In other words, a sheet that is possible to feed from a sheet feeder tray is used to indicate a print restart position.

If it is not possible to feed the selected sheet because it is not stored in any of the sheet feeder trays 300 through 302 (NO in step S103), the notifying unit 204 supplies information that it is not possible to feed the selected sheet in step S106. This information is displayed on the operation display 23.

Figure 8:
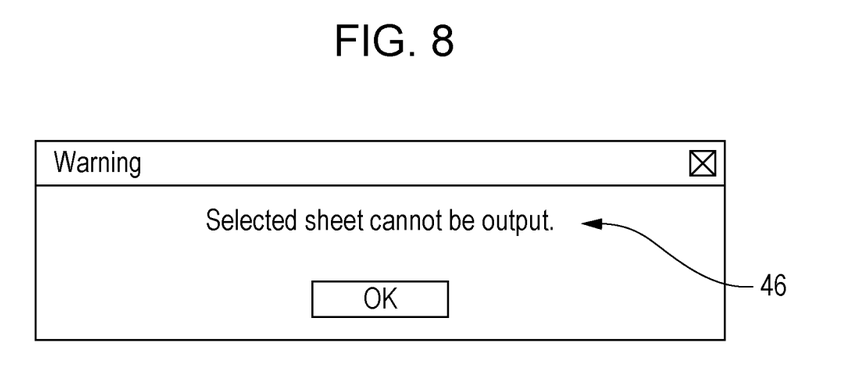
FIG. 8 illustrates an example of a message displayed when it is not possible to feed a sheet selected to indicate a print restart position.

For example, as shown in FIG. 8, a message 46 that it is not possible to feed the selected sheet is displayed on the operation display 23.

If such information is displayed, the user handles this situation at the user's discretion. For example, the user may insert a certain mark on a sheet which has been loaded in a sheet output tray before printing has stopped or remove loaded sheets from the sheet output tray and then restarts printing.

If the sheet output tray has an offset function (YES in step S102), the print controller 102 executes print restart processing by using the offset function in step S107.

That is, if printed sheets are output to the stacker tray 321 or 322 having an offset function, a sheet to be used first for printing the document content after printing is restarted is output such that it is displaced from the sheets loaded in the stacker tray 321 or 322 by using the offset function, thereby making it possible to indicate the print restart position.

In the above-described first exemplary embodiment, when a printed material is output to a sheet output tray without an offset function, such as the top tray 320, or when it is output to a sheet output tray with an offset function by not using the offset function, a sheet, such as a blank sheet, arranged in a direction with respect to the transport direction different from that of the previously used sheets is first output after printing is restarted such that it will partially protrude from the other sheets when being loaded in the sheet output tray. This enables a user to check a print restart position.

Second Exemplary Embodiment

A second exemplary embodiment of the invention will be described below.

The print control system 1, the print control apparatus 2, the printer apparatus 3, and the terminal apparatus 4 of the second exemplary embodiment are similar to those of the first exemplary embodiment. The operation of the print control apparatus 2 is also similar to that shown in FIG. 4. The second exemplary embodiment will be discussed below by referring to portions different from the first exemplary embodiment.

In the second exemplary embodiment, the document content to be printed after printing is restarted is printed on a sheet arranged in a direction with respect to the transport direction different from that of the previously output sheets, thereby indicating a print restart position.

More specifically, on the GUI screen 40 shown in FIG. 5, the check box 400 "Enable recovery offset" is checked, and then, the radio button 401 for the option "Offset document content" is selected. Then, the check box 402 "Feed an SEF sheet if the direction of previously used sheet is LEF and vice versa" is checked.

Figure 9:
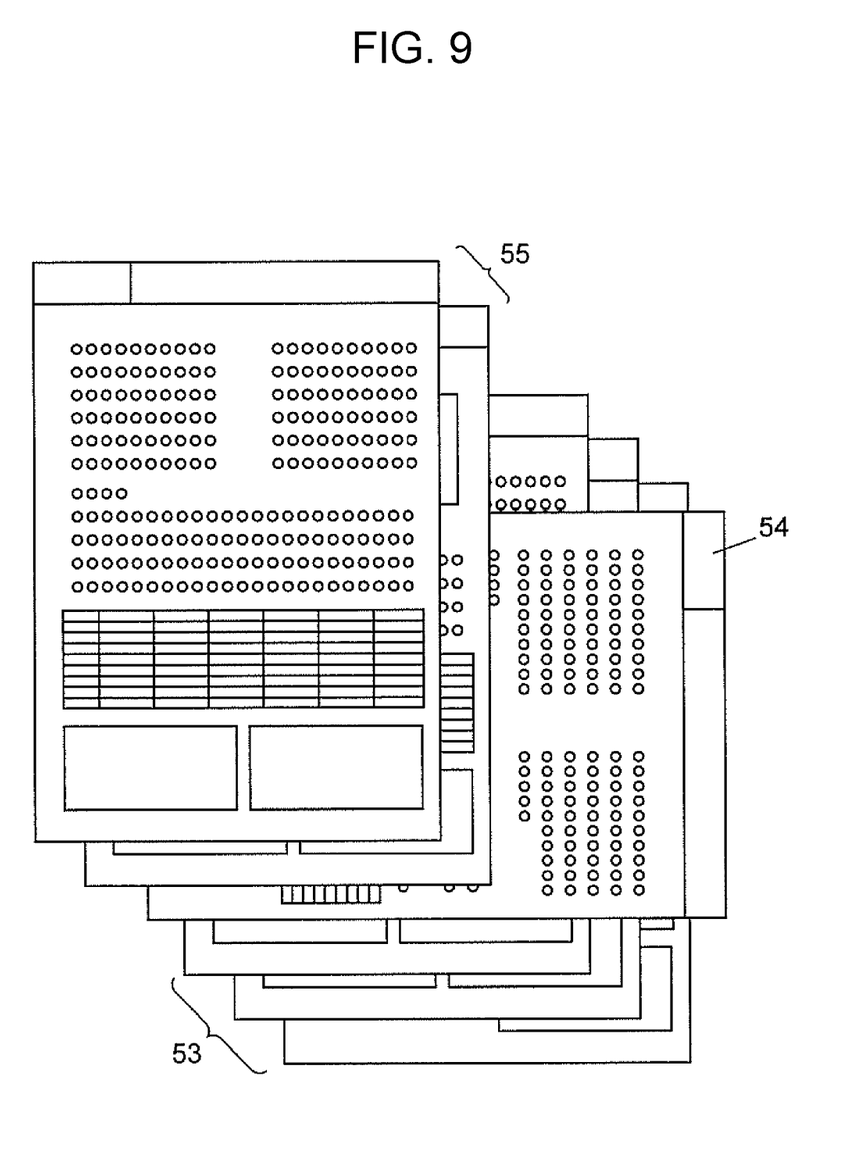
FIG. 9 illustrates a state in which a printed sheet arranged in a different direction is inserted to indicate a print restart position in a second exemplary embodiment.

FIG. 9 illustrates a state in which, to indicate a print restart position, a sheet used first for printing the document content after printing is restarted is output such that the direction thereof is changed from that of the previously output sheets. As shown in FIG. 9, subsequent to sheets 53 which have been output before printing has stopped, a sheet 54 used first for printing the document content after printing is restarted is output such that the direction thereof is changed from that of the sheets 53. Then, sheets 55 on which the document content continuing from that on the sheet 54 is printed are output in the same direction as that of the sheets 53.

In the second exemplary embodiment, a sheet to be used first for printing the document content after printing is restarted is output such that the direction thereof is changed from that of the previously output sheets. This enables a user to check a print restart position.

As in the first exemplary embodiment, the notifying unit 204 notifies a user after printing is restarted that a sheet different from sheets used before printing has stopped has been output to indicate a print restart position or that a selected sheet is not possible to feed because it is not stored in any sheet feeder trays.

Third Exemplary Embodiment

A third exemplary embodiment of the invention will be described below.

In the third exemplary embodiment, as a sheet used for indicating a print restart position, a sheet of a larger size than the previously output sheets is output. The print control system 1, the print control apparatus 2, the printer apparatus 3, and the terminal apparatus 4 of the third exemplary embodiment are similar to those of the first exemplary embodiment. The operation of the print control apparatus 2 is also similar to that shown in FIG. 4.

In this case, on the GUI screen 40 shown in FIG. 5, the check box 400 "Enable recovery offset" is checked, and then, the radio button 401 for the option "Insert a blank sheet" is selected. Then, the check box 403 "Feed a larger size of sheet" is checked.

Figure 10:
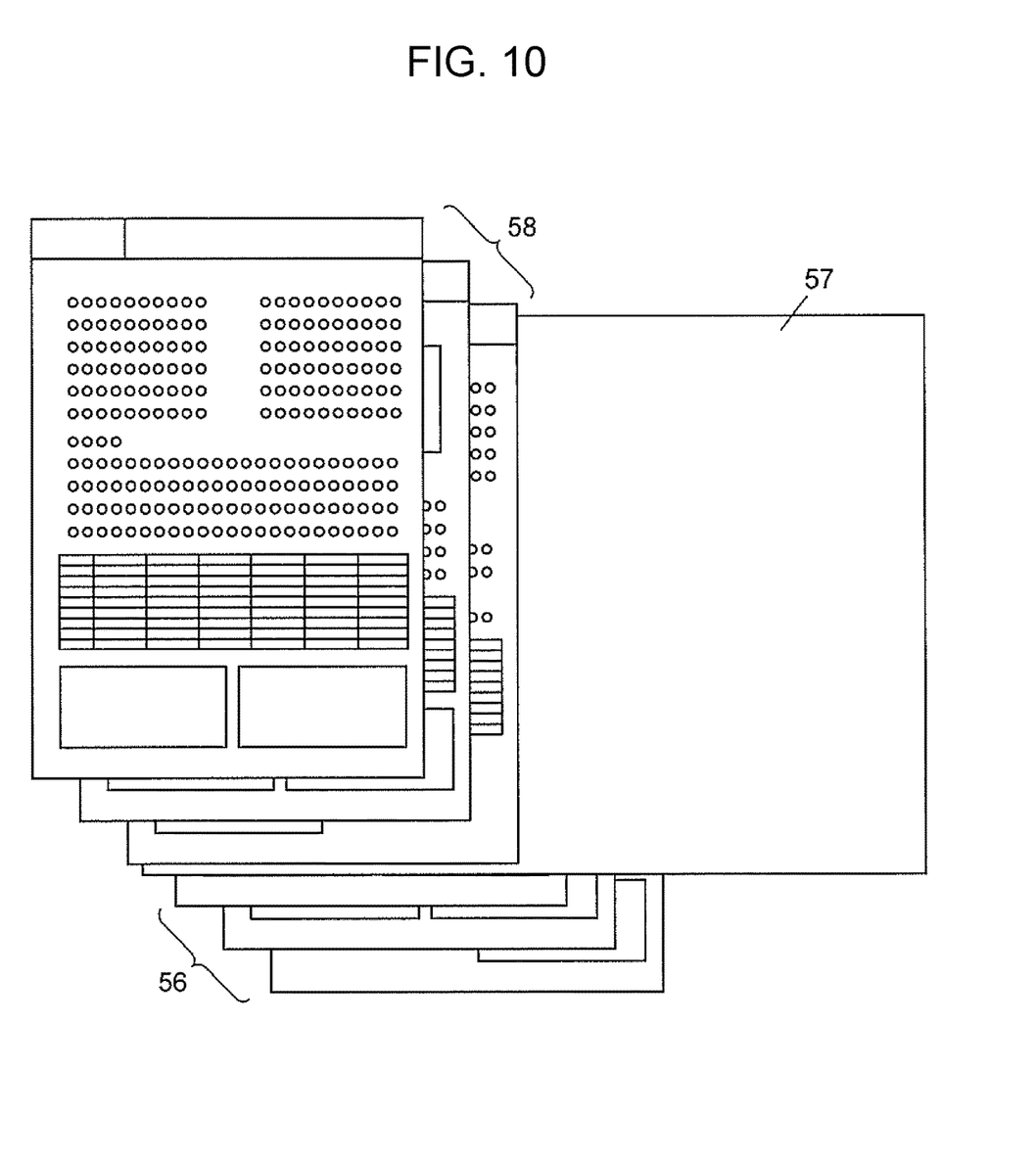
FIG. 10 illustrates a state in which a larger size of sheet is output to indicate a print restart position in a third exemplary embodiment.

FIG. 10 illustrates a state in which a larger size of sheet is output to indicate a print restart position. In the example in FIG. 10, during the execution of a print instruction to print the document content on A4 sheets, printing has stopped, and when printing is restarted, an A3 blank sheet, which is larger than A4 sheets, is inserted to indicate a print restart position.

In FIG. 10, when printing has stopped, multiple printed A4 sheets 56 have already been output. Then, when printing is restarted, an A3 blank sheet 57 is inserted before restarting to print the document content. Then, the document content continuing from that of the sheets 56 is printed on A4 sheets 58.

In this manner, when printing has stopped during the execution of a print instruction, if a sheet of a larger size than that of the previously output sheets is stored in a sheet feeder tray, a sheet is output from this tray as the first sheet after printing is restarted to indicate a print restart position. This enables a user to check the print restart position.

When a larger size of sheet is used, a blank sheet is output. In the GUI screen 40 shown in FIG. 5, a user has input the width and height to specify a sheet having a predetermined size or greater. However, regardless of the size of the previously printed sheets, a specific size of sheet, such as the largest size of sheet among those stored in sheet feeder trays, may be specified.

As in the first exemplary embodiment, the notifying unit 204 notifies a user after printing is restarted that a sheet different from sheets used before printing has stopped has been output to indicate a print restart position or that a selected sheet is not possible to feed because it is not stored in any sheet feeder trays.

Fourth Exemplary Embodiment

A fourth exemplary embodiment of the invention will be described below.

In the first through third exemplary embodiments, even when printed materials are output to a sheet output tray without an offset function, a user can check a print restart position. More specifically, when printing is restarted, a blank sheet of the same size as the previously output sheets and arranged in a different direction from that of the previously output sheets is output, or the document content is printed on a sheet of the same size as the previously output sheets and arranged in a different direction from that of the previously output sheets. Alternatively, a sheet of a different size from that of the previously output sheets is output. That is, when the above-described sheets are output, they partially protrude from the previously output sheets in a sheet output tray, thereby enabling a user to check a print restart position.

However, the present invention is also applicable to a case in which printed materials are output to a sheet output tray with an offset function by using the offset function. An example of such a case will be described below in the fourth exemplary embodiment.

It is now assumed that multiple sets of sheets, each having a small number of pages, are output to a sheet output tray with an offset function (collate printing), and during the execution of such a collate printing instruction, printing has stopped. In this case, if a sheet to be used first after printing is restarted is output by displacing it from the other sheets, a user may find it difficult to distinguish the individual sets of printed sheets from each other because each set has only a small number of pages.

The fourth exemplary embodiment deals with such a situation. The print control system 1, the print control apparatus 2, the printer apparatus 3, and the terminal apparatus 4 of the fourth exemplary embodiment are similar to those of the first exemplary embodiment.

Figure 11:
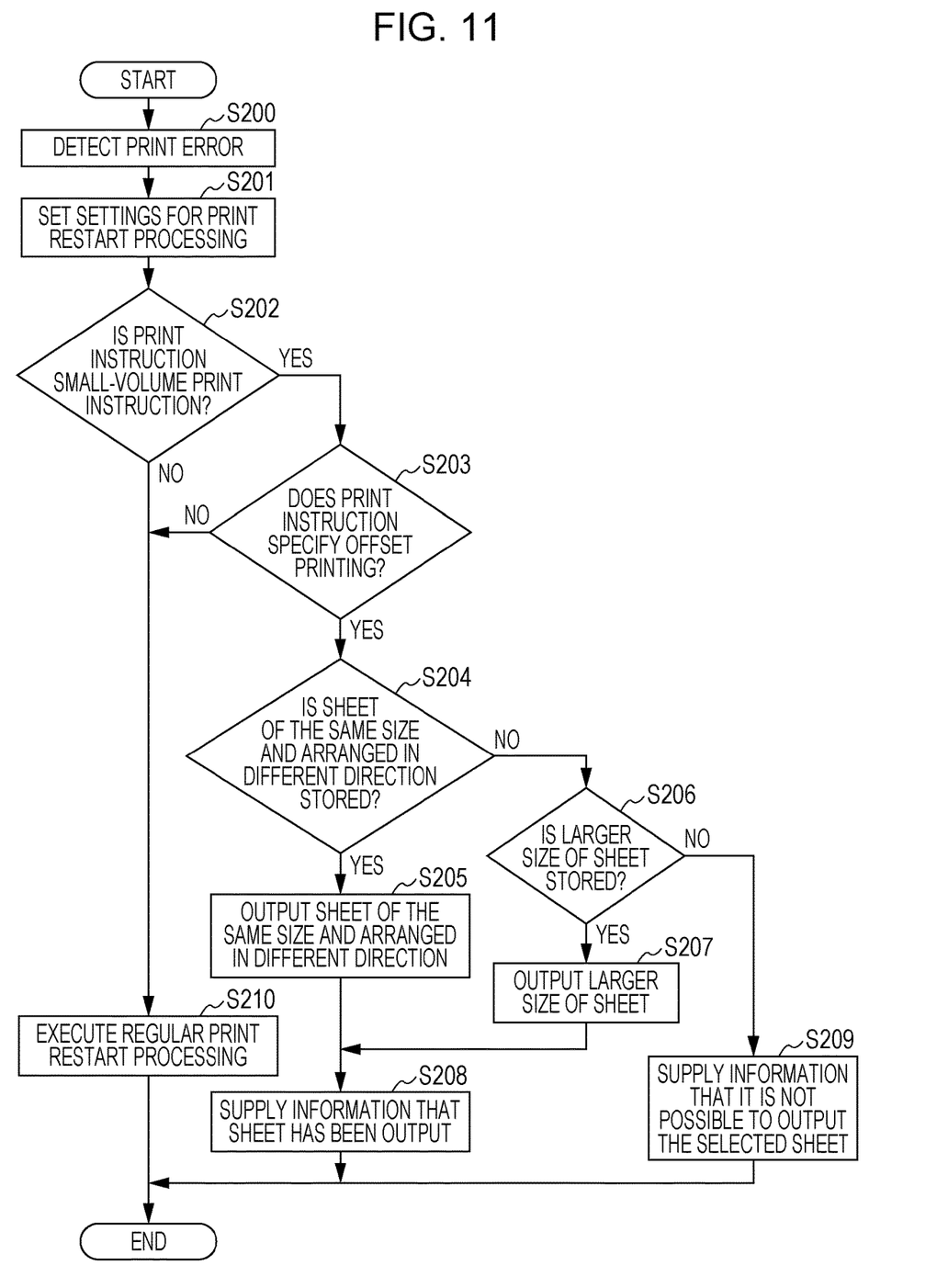
FIG. 11 is a flowchart illustrating an example of the operation of the print control apparatus according to a fourth exemplary embodiment.

FIG. 11 is a flowchart illustrating an example of the operation of the print control apparatus 2 according to the fourth exemplary embodiment.

In step S200, the error detector 202 of the print control apparatus 2 regularly receives from the printer apparatus 3 information concerning the state of the printer apparatus 3 and detects the occurrence of a print error based on the information.

Upon detection of a print error, in step S201, the print controller 201 stops printing executed by the printer apparatus 3 and sets settings for print restart processing to be executed after the printer apparatus 3 has recovered from the error. That is, the print controller 201 sets settings for restarting printing, such as a setting concerning whether to execute processing for providing a mark for indicating a print restart position to printed sheets to be loaded in the loader 32 (that is, whether recovery offset will be performed) and settings concerning the content of recovery offset if it is executed. Settings for print restart processing are set by using a GUI screen displayed on the operation display 23 of the print control apparatus 2.

Figure 12:
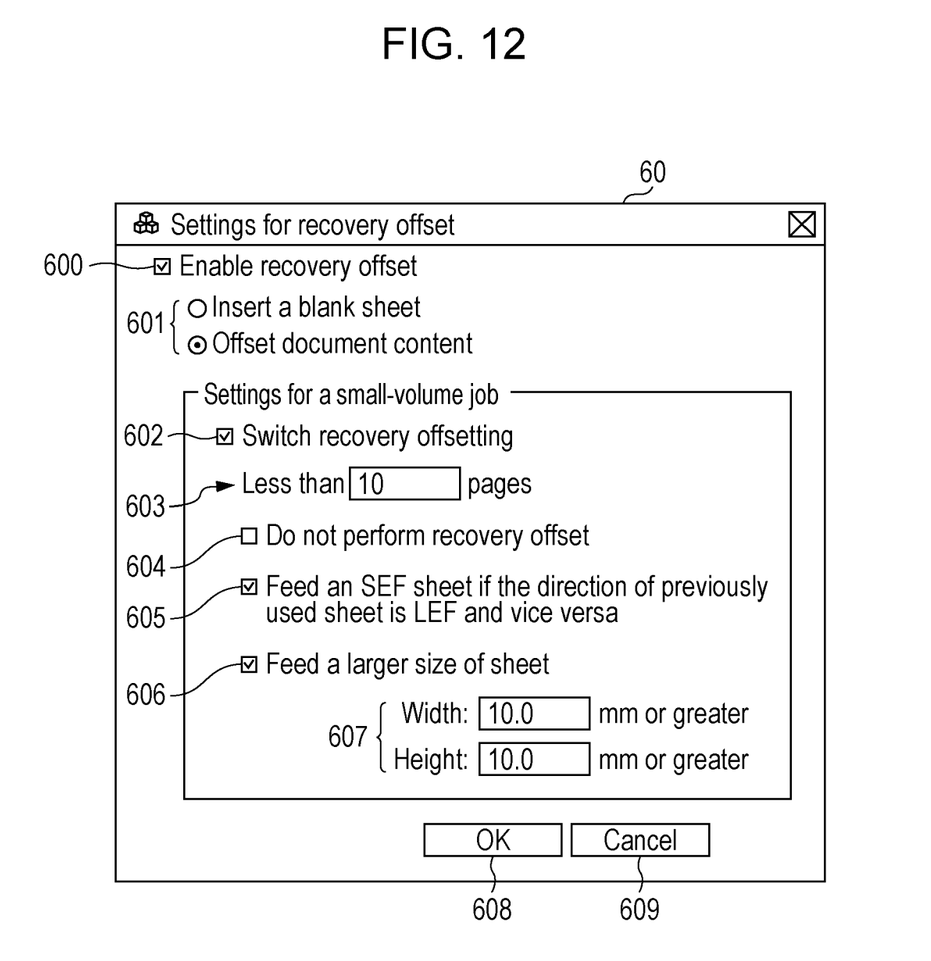
FIG. 12 illustrates an example of a GUI screen for setting settings for print restart processing for a small-volume print instruction in the fourth exemplary embodiment.

FIG. 12 illustrates an example of a GUI screen for setting settings for print restart processing. On a GUI screen 60 shown in FIG. 12, if processing for providing a mark for indicating a print restart position is executed, a check box 600 "Enable recovery offset" is checked. Then, as a mark to be used for indicating a print restart position, an option of inserting a blank sheet at a print restart position or an option of changing the direction of a sheet to be used first for printing the document content after printing is restarted is selected by clicking a corresponding one of radio buttons 601. In FIG. 12, the option "Offset document content" is selected.

Then, settings for a small-volume print instruction are set. First, a check box 602 "Switch recovery offsetting" is checked. Then, the number of pages to be treated as small-volume printing is input into a numeric value input box 603. In the example in FIG. 12, 10 pages are regarded as small-volume printing. That is, recovery offset based on the settings set on the GUI screen 60 is performed for a print instruction to print multiple sets of sheets, each set having smaller than 10 pages.

In the example in FIG. 12, processing for providing a mark for indicating a print restart position is executed, and thus, a check box 604 "Do not perform recovery offset" is not checked. Then, a sheet to be inserted to indicate a print restart position is selected. In the example in FIG. 12, both of a check box 605 "Feed an SEF sheet if the direction of previously used sheet is LEF and vice versa" and a check box 606 "Feed a larger size of sheet" are checked. If both of the options in the check boxes 605 and 606 are selected, a higher priority is given to the option displayed above (check box 605 in FIG. 12) than to the option below (check box 606 in FIG. 12), as in the first exemplary embodiment. That is, priority is given to the option "Feed an SEF sheet if the direction of previously used sheet is LEF and vice versa". A sheet arranged in a different direction from that of a sheet used before printing has stopped is preferentially output.

If a different size of sheet, such as a larger size of sheet, is selected, the width and height of a sheet are input into numeric value input boxes 607 by numeric values. In the example in FIG. 12, "10 mm or greater" is input as the width and height. After finishing inputting settings, when the user clicks an "OK" button 608, the settings are set. If the user wants to cancel settings, the user clicks a "Cancel" button 609 to cancel all the settings input by the user.

The print controller 201 may set settings for print restart processing in advance before starting printing, instead of doing when printing has stopped.

After finishing settings for print restart processing, print restart processing is started. Then, the print controller 201 judges in step S202 whether a print instruction is a small-volume print instruction. That is, since less than 10 pages is set as small-volume printing in the above-described settings, the print controller 201 judges whether each set of sheets in the current print instruction has less than 10 pages.

If each set of sheets has less than 10 pages (YES in step S202), the print controller 201 judges in step S203 whether offset printing is specified in the print instruction.

If offset printing is specified in the print instruction (YES in step S203), the print controller 201 asks the printer apparatus 3 and judges in step S204 whether the sheet selected in S201 is available. On the GUI screen 60 in FIG. 12, a sheet of the same size as the currently output sheets and arranged in a different direction from that of the currently output sheets and a sheet of a larger size than the currently output sheets are both selected. Priority is given to a sheet of the same size and arranged in a different direction. The print controller 201 thus judges in step S204 whether a sheet of the same size and arranged in a different direction is stored in a sheet feeder tray.

If a sheet of the same size and arranged in a different direction is stored in a sheet feeder tray (YES in step S204), a sheet is fed from this tray and output after printing is restarted as a sheet for indicating a print restart position in step S205.

If a sheet of the same size and arranged in a different direction is not stored in any sheet feeder trays (NO in step S204), the print controller 201 judges in step S206 whether a larger size of sheet, which is set on the GUI screen 60 in FIG. 12, is stored in a sheet feeder tray.

If a larger size of sheet is stored in a sheet feeder tray (YES in step S206), a sheet is fed from this tray and output after printing is restarted as a sheet for indicating a print restart position in step S207. In this case, a blank sheet is output.

Figure 13:
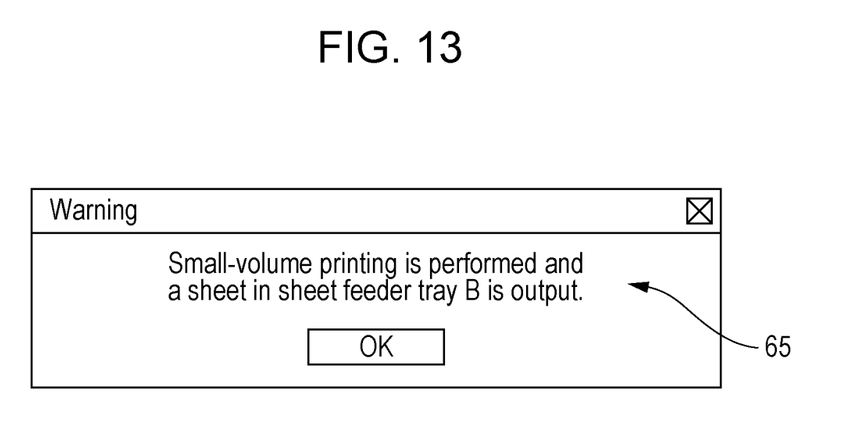
FIG. 13 illustrates an example of a message displayed when a sheet is inserted to indicate a print restart position in small-volume printing.

If a sheet of the same size and arranged in a different direction is output in step S205 or if a larger size of sheet is output in step S207, the notifying unit 204 supplies information that such a sheet has been output in step S208. For example, if the output sheet is stored in the sheet feeder tray 301 (sheet feeder tray B), a message 65 that small-volume printing is performed and a sheet in the sheet feeder tray B is output is displayed on the operation display 23, as shown in FIG. 13.

If a larger size of sheet is not stored in any sheet feeder trays (NO in step S206), the notifying unit 204 supplies information in step S209 that it is not possible to output the selected sheet, as the message 46 shown in FIG. 8, for example.

If a print instruction is not a small-volume print instruction (NO in step S202) or if a print instruction is a small-volume print instruction but offset printing is not specified in the print instruction (NO in step S203), regular print restart processing is executed in step S210. That is, the sheet output tray has an offset function, and a sheet to be output first after printing is restarted is output such that it is displaced from the other sheets by using the offset function.

If a print instruction is not a small-volume print instruction, a sheet to be output first after printing is restarted can be output such that it is displaced from the other sheets, and a user can still check a print restart position. If a print instruction is a small-volume print instruction but offset printing is not specified in the print instruction, printed sheets are output all in one stack. Hence, a sheet to be output first when printing is restarted is output such that it is displaced from the other sheets so that a user can check a print restart position.

In the fourth exemplary embodiment, when multiple sets of sheets, each having a small number of pages, are output to a sheet output tray with an offset function (collate printing), a sheet of the same size as the previously output sheets and arranged in a different direction from that of the previously output sheets or a sheet of a larger size than the previously output sheets is output after printing is restarted so that it can protrude from the other sheets in the sheet output tray. This enables a user to distinguish the individual sets of a small volume of printed sheets from each other.

In the above-described exemplary embodiments, after printing has stopped and when printing is restarted, a sheet which will protrude from the other sheets in a sheet output tray is output so that a user can check a print restart position (position at which printing has stopped). However, the present invention may also be applicable to the following case. While a print instruction is being executed, a sample sheet, which is a check page, may be output to the same loader, such as a sheet output tray, as the other sheets. In this case, a sheet which will protrude from the other sheets in a sheet output tray may be used as the sample sheet, so that the user can easily identify the position of the sample sheet.

Examples of a sheet which will protrude from the other sheets in a sheet output tray are a sheet arranged in a direction with respect to a transport direction different from a direction of the previously used sheets, a sheet larger than the previously used sheets in a transport direction or a direction perpendicular to the transport direction, and a sheet of a predetermined size.

Although the exemplary embodiments have been discussed above, the present invention is not restricted thereto. Various modifications may be made without departing from the spirit and scope of the invention. For example, the printer apparatus 3 may have the functions of the print control apparatus 2 as a controller. The print control program 210 in the above-described exemplary embodiments may be stored in a recording medium, such as a compact disc-read only memory (CD-ROM), and be provided.

The print control program 210 may be stored in an external server, such as a cloud server, and be used via a network.

All or some of the elements of the controller 20 may be constituted by a hardware circuit, such as a field programmable gate array (FPGA) or an application specific integrated circuit (ASIC).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information control apparatus that controls a printer apparatus, the printer apparatus including a loader which stacks and loads sheets fed from a sheet feeder and then printed, comprising:
    a controller that performs control, in a case in which printing performed by the printer apparatus is stopped and is then restarted, so that a sheet which will protrude from other sheets when being loaded in the loader will be fed from the sheet feeder and be loaded in the loader as a sheet to be inserted to indicate a restart position.

2. The information control apparatus according to claim 1, wherein, if, as the sheet which will protrude from the other sheets, a sheet arranged in a direction with respect to a transport direction different from a direction of a sheet used before the printing has stopped is stored in a sheet feeder tray, the controller performs control so that a sheet will be fed from the sheet feeder tray and be loaded in the loader when the printing is restarted.

3. The information control apparatus according to claim 1, wherein, if, as the sheet which will protrude from the other sheets, a sheet larger than a sheet used before the printing has stopped by a predetermined numeric value or greater is stored in a sheet feeder tray, the controller performs control so that a sheet will be fed from the sheet feeder tray and be loaded in the loader when the printing is restarted.

4. The information control apparatus according to claim 1, wherein, if, as the sheet which will protrude from the other sheets, a sheet of a predetermined size is stored in a sheet feeder tray, the controller performs control so that a sheet will be fed from the sheet feeder tray and be loaded in the loader when the printing is restarted.

5. The information control apparatus according to claim 1, further comprising:
   a selector that selects a sheet to be inserted to indicate the restart position when the printing is restarted; and
   a display,
   wherein the controller performs control so that a selection screen will be displayed on the display, the selection screen being used for causing the selector to select at least one of a sheet arranged in a direction with respect to a transport direction different from a direction of a sheet used before the printing has stopped and a sheet of a different size from the sheet used before the printing has stopped, as the sheet to be inserted to indicate the restart position.

6. The information control apparatus according to claim 5, wherein, if both of the sheet arranged in a direction with respect to the transport direction different from the direction of the sheet used before the printing has stopped and the sheet of a different size from the sheet used before the printing has stopped are selected on the selection screen, the controller performs control so that the selector will preferentially select the sheet arranged in a direction with respect to the transport direction different from the direction of the sheet used before the printing has stopped, as the sheet to be inserted to indicate the restart position.

7. The information control apparatus according to claim 5, wherein, if both of the sheet arranged in a direction with respect to the transport direction different from the direction of the sheet used before the printing has stopped and the sheet of a different size from the sheet used before the printing has stopped are selected on the selection screen, the controller performs control so that the selector will preferentially select the sheet of a different size from the sheet used before the printing has stopped, as the sheet to be inserted to indicate the restart position.

8. The information control apparatus according to claim 5, wherein, if both of the sheet arranged in a direction with respect to the transport direction different from the direction of the sheet used before the printing has stopped and the sheet of a different size from the sheet used before the printing has stopped are selected on the selection screen, the controller performs control so that the selector will preferentially select a sheet that is possible to feed from a sheet feeder tray, as the sheet to be inserted to indicate the restart position.

9. The information control apparatus according to claim 5, wherein, if a sheet selected by the selector as the sheet to be inserted to indicate the restart position is not possible to feed, the controller supplies information indicating that it is not possible to feed the selected sheet.

10. The information control apparatus according to claim 1, wherein, if collate printing for printing a plurality of sets of a document performed by the printer apparatus is stopped and is then restarted, the controller performs control so that a sheet arranged in a direction with respect to a transport direction different from a direction of a sheet used before the collate printing has stopped, a sheet larger than the sheet used before the collate printing has stopped, or a sheet of a predetermined size will be fed and inserted at a position before a set of the document to be first printed after the collate printing is restarted.

11. An information control system, comprising:
   a printer apparatus that includes a loader which stacks and loads sheets fed from a sheet feeder and then printed; and
   an information control apparatus that includes a controller which performs control, in a case in which printing performed by the printer apparatus is stopped and is then restarted, so that a sheet which will protrude from other sheets when being loaded in the loader will be fed from the sheet feeder and be loaded in the loader as a sheet to be inserted to indicate a restart position.

12. A non-transitory computer readable medium storing a program causing a computer to execute a process for controlling a printer apparatus, the printer apparatus including a loader which stacks and loads sheets fed from a sheet feeder and then printed, the process comprising:
   performing control, in a case in which printing performed by the printer apparatus is stopped and is then restarted, so that a sheet which will protrude from other sheets when being loaded in the loader will be fed from the sheet feeder and be loaded in the loader as a sheet to be inserted to indicate a restart position.

* * * * *